C. D. PLATT.
CLAMP.
APPLICATION FILED JAN. 4, 1915.

1,135,612.

Patented Apr. 13, 1915.

WITNESSES

INVENTOR
Clarence D. Platt,
ATTORNEY

UNITED STATES PATENT OFFICE.

CLARENCE D. PLATT, OF BRIDGEPORT, CONNECTICUT.

CLAMP.

1,135,612.  Specification of Letters Patent.  Patented Apr. 13, 1915.

Application filed January 4, 1915. Serial No. 478.

*To all whom it may concern:*

Be it known that I, CLARENCE D. PLATT, a citizen of the United States of America, and residing at Bridgeport, in the county of Fairfield and State of Connecticut, have invented new and useful Improvements in Clamps, of which the following is a specification.

My invention relates to clamping or anchorage devices for securing in place various forms of fixtures and attachments.

One use to which the invention is particularly adapted is the securing in place of the fronts or outside frames of panel board cabinets, ventilators and registers.

The objects of the invention are to provide a simple, strong, reliable clamp construction which will be inexpensive, easy to assemble, and convenient to use.

In its simplest form the clamp consists of an anchorage in the form of a clamp bar which is thickened in its intermediate portion and provided with a passage therethrough, a screw bolt disposed in said passage and a member on the said bolt having a rocking bearing in the opposite sides of such widened or thickened portion of the bar. In the preferred form the clamp bar is made up of a pair of complementary sheet metal plates secured together in flat engagement at their end portions as by means of rivets and bowed outwardly in their intermediate portions to provide the passage for the bolt. The member on the bolt is usually in the form of a nut and the bearing for this nut is usually provided by making openings in the spaced apart sides of the clamp bar large enough to receive the nut and to permit of its being inserted in through the sides of the bar. After the nut has in this way been inserted into its seat through the side of the bar and the bolt has been inserted through the passage and engaged therewith, the three parts will be held in properly assembled relation.

The accompanying drawing illustrates the invention in two of its preferred embodiments but it will be understood that changes and modifications may be made without departure from the true spirit and scope of the invention.

Figure 1:
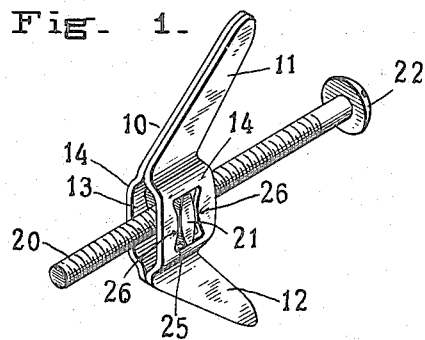
Figure 2:
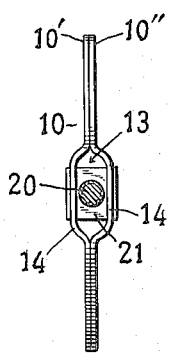
Figure 4:
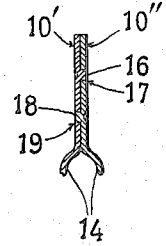
Figure 3:
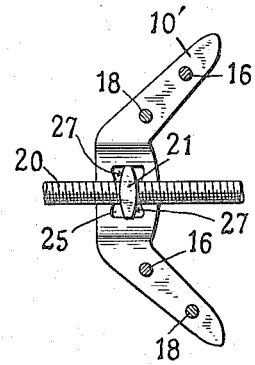
Figure 5:
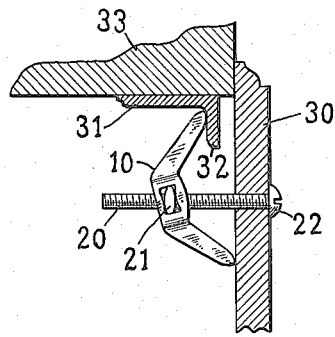
Figure 6:
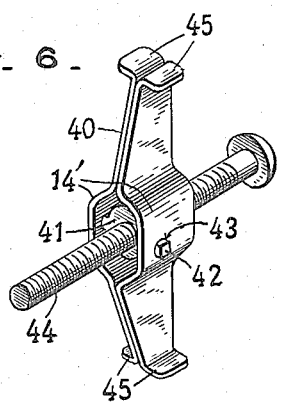

Figure 1, is a view in perspective of a clamp embodying the invention. Fig. 2, is an end view of the same with the screw bolt appearing in section. Fig. 3, is a side view with the near one of the two clamp plates removed, the rivets which fasten the two plates together being shown in section. Fig. 4, is a central sectional view of one of the arms of the clamp bar, showing the preferred method of riveting the two plates together. Fig. 5, is a view illustrating the application of the clamp to the holding of a panel box front to a cabinet, parts appearing in section. Fig. 6, is a perspective view of a slightly different form of the clamp.

10 designates the so-called clamp bar or anchorage, having oppositely disposed arms 11 and 12 which in the first form shown are arranged on divergent angles. These arms are relatively thin as indicated, but they are made wide enough to give the necessary strength and to offer the necessary resistance to the pull of the clamping bolt. At the central or intermediate portion, the anchorage bar is thickened and provided with a passage 13 therethrough, leaving spaced apart sides 14.

It is preferred, as heretofore stated, to make the clamp bar of two complementary sheet metal plates, such as indicated at 10' and 10'', relatively flat at their end portions to lie in flat engagement with each other and thereby constitute the equivalent of a solid bar and bowed or offset laterally in their intermediate portions, as indicated, to provide the intermediate spaced apart sides 14. The two complementary plates are suitably secured together, in the present instance by means of rivets, the metal for which is provided as indicated best in Fig. 4 by punching the metal of one plate through an opening formed in the other plate. In the illustration there are four such rivets, two of them 16, 16 being punched from plate 10' through openings 17 in plate 10'' and the other two of them 18 on plate 10'' being riveted through openings 19 in plate 10'.

20, designates the screw bolt disposed in the passage 13 in the anchor bar and 21 the member on said screw rockably supported by the spaced apart sides 14 of the bar. In the illustrations this member is in the form of a nut and the screw bolt is provided at one end with a head 22 affording a hold by which the bolt can be turned in the nut.

In the first embodiment shown, the nut is fulcrumed in the clamp bar by seating it in oppositely disposed openings 25 provided in the spaced apart sides of the bar. These openings are slightly larger than the nut and therefore permit of the nut, detached from the bolt, being inserted through the opening in one side over into bearing engagement in the opening in the other side. When the bolt is then inserted through the passage into engagement with the nut, the parts will then be held in their properly assembled relation.

The bearing openings are but slightly longer than the nut so as to hold the nut against turning in the anchor bar but they are made wide enough to permit a free rocking movement of the nut. Preferably the bearing edges 26 of the openings are convexed, as indicated, to facilitate the rocking of the nut and the bearing surfaces of the nut may be likewise convexed or rounded, as indicated at 27.

Fig. 5, illustrates a practical application of the invention wherein it is employed for securing the front or finishing frame 30 to a panel box cabinet 31. One arm of the clamp bar engages inside a flange 32 at the forward edge of the cabinet and the other arm bears against the inner face of the front or finishing frame. The screw bolt is passed through an opening in the front into engagement with the nut on the clamp bar and it is evident that as the bolt is turned in the right direction the front will be drawn toward the cabinet and into proper engagement with the surface of the wall 33.

In the form of the invention shown in Fig. 6 the clamp bar 40 is straight instead of arched and the member 41 is engaged in the spaced apart sides 14' of the bar by providing it with projecting lugs 42 seating in bearing openings 43 in the sides. Here also the member 41 is shown in the form of a nut with which the screw bolt 44 engages. The extreme ends of the clamping bar are shown as spread apart or opened out to provide laterally extending flanges 45 which afford relatively wide bearing surfaces at the ends of the bar. This form is somewhat more expensive to make. Obviously the arms of the bar can be arched as in the first form of the device.

What I claim is:—

1. In a clamp, a clamp bar comprising a pair of plates secured together in flat engagement at their end portions and spaced apart at their intermediate portions, a screw bolt disposed in the space thus provided between the intermediate portions of said plates and a nut on the said bolt having a bearing in the aforesaid spaced apart portions of the clamp bar plates.

2. In a clamp, a clamp bar comprising a pair of plates secured together in flat engagement at their end portions and spaced apart at their intermediate portions, a screw bolt disposed in the space thus provided between the intermediate portions of said plates, the said spaced apart portions of the clamp plates having seats formed therein and a nut on the bolt having portions bearing in the said seats.

3. In a clamp, a clamp bar comprising a pair of plates secured together in flat engagement at their end portions and spaced apart at their intermediate portions a screw bolt disposed in the space thus provided between the intermediate portions of said plates, the said spaced apart portions of the clamp plates having oppositely disposed openings therein provided with convexed bearing edges and a nut on the bolt engaged in the said openings and having a bearing on the convexed edges thereof.

4. In a clamp, a clamp bar comprising a pair of plates secured together in flat engagement at their end portions and spaced apart at their intermediate portions, the said spaced apart portions of the clamp plates having oppositely disposed openings formed therein, a nut rockably engaged in the said openings and a screw bolt engaging the said nut.

5. In a clamp, a clamp bar comprising a pair of complementary plates each having relatively flat end portions united by an intermediate bowed portion laterally offset from the planes of such end portions and the said two plates being secured together with their end portions in flat engagement and their intermediate bowed portions providing a space between the plates intermediate their length, the said intermediate bowed portions having oppositely disposed openings therein, a screw bolt disposed in the space provided between the intermediate bowed portions of the plates and a nut on the bolt engaged in the oppositely disposed openings in the aforesaid bowed portions of the clamp plates.

6. In a clamp, a pair of complementary plates having flat end portions and bowed intermediate portions provided with recesses, means securing the end portions of the plates in flat engagement with each other and with the complementary bowed portions oppositely disposed and providing a passage between the plates, a nut seated in the recesses in the bowed portions of the plates, and a bolt engaging the said nut.

7. In a clamp, a pair of complementary clamp plates each having relatively flat end portions united by an intermediate bowed portion offset laterally from the plane of the flat end portions and provided with an opening therein, said plates being assembled with their end portions in flat engagement and the intermediate bowed portions oppositely disposed to provide a passage between the plates, rivets securing the flat end portions of the plates in permanent engagement, a nut non-rotatably seated in the openings in the bowed portions of the plates and a bolt engaging said nut.

8. In a clamp, a clamp bar comprising a pair of plates secured together in flat engagement at their end portions and spaced apart at their intermediate portions, a screw bolt disposed in the space thus provided between the intermediate portions of said plates, the said spaced apart portions of the clamp plates having oppositely disposed openings therein narrowest at the center and widest at the ends thereof and a nut on the bolt rockably and non-rotatably engaged in the aforesaid openings in the plates.

9. In a clamp, a screw bolt, a nut, and a clamp bar having relatively thin end portions, a thickened intermediate portion provided with a passage therethrough receiving the bolt and the said thickened intermediate portion further having oppositely disposed openings in the sides thereof of a size to receive the nut, whereby said nut can be inserted in through the side of the clamp bar and the bolt be afterward inserted through the passage and engaged therewith.

CLARENCE D. PLATT.

Witnesses:
MARCUS M. SCHENK,
PHILIP S. MCLEAN.